(12) United States Patent
Moine

(10) Patent No.: US 11,491,870 B2
(45) Date of Patent: Nov. 8, 2022

(54) METHOD FOR LIMITING THE SPEED OF A MOTORCYCLE

(71) Applicants: CONTINENTAL AUTOMOTIVE FRANCE, Toulouse (FR);
CONTINENTAL AUTOMOTIVE GMBH, Hannover (DE)

(72) Inventor: Xavier Moine, Cugnaux (FR)

(73) Assignees: CONTINENTAL AUTOMOTIVE FRANCE, Toulouse (FR);
CONTINENTAL AUTOMOTIVE GMBH, Hannover (DE)

( * ) Notice: Subject to any disclaimer, the term of this patent is extended or adjusted under 35 U.S.C. 154(b) by 290 days.

(21) Appl. No.: 16/633,036

(22) PCT Filed: Jul. 17, 2018

(86) PCT No.: PCT/FR2018/051813
§ 371 (c)(1),
(2) Date: Jan. 22, 2020

(87) PCT Pub. No.: WO2019/020904
PCT Pub. Date: Jan. 31, 2019

(65) Prior Publication Data
US 2020/0207205 A1    Jul. 2, 2020

(30) Foreign Application Priority Data

Jul. 25, 2017 (FR) ...................................... 1757059

(51) Int. Cl.
*B60K 31/00* (2006.01)
(52) U.S. Cl.
CPC ...... *B60K 31/00* (2013.01); *B60K 2031/0091* (2013.01); *B60Y 2200/12* (2013.01); *B60Y 2300/146* (2013.01)

(58) Field of Classification Search
CPC ............ B60K 31/00; B60K 2031/0091; B60Y 2200/12; B60Y 2300/146
(Continued)

(56) References Cited

U.S. PATENT DOCUMENTS 4,052,914 A * 10/1977 Nakajima ............... B62M 11/16
475/299
6,324,464 B1 * 11/2001 Lee ..................... B60L 15/2045
180/65.6
(Continued)

FOREIGN PATENT DOCUMENTS

CN       1273188 A       11/2000
CN       1493488 A        5/2004
(Continued)

OTHER PUBLICATIONS

International Search Report, PCT/FR2018/051813, dated Oct. 26, 2018.
(Continued)

*Primary Examiner* — Gertrude Arthur Jeanglaude
(74) *Attorney, Agent, or Firm* — Nixon & Vanderhye

(57) ABSTRACT

Disclosed is a solution to the use of a speed limiter in a motorcycle that has a high capacity for acceleration, including a method for limiting the speed of a motorcycle using precise parameters of speed, acceleration and required engine torque and a single control button to manage the smart activation and deactivation of the limiter and to input new speed limits $V_{lim}$ in a simple way. It thus allows the use of a speed-limiting system in a motorcycle that has a high power/weight ratio by avoiding the sources of interference with the riding and the effects liable to jeopardize its stability.

20 Claims, 2 Drawing Sheets

(58) Field of Classification Search
USPC .......................................................... 701/93
See application file for complete search history.

(56) References Cited

U.S. PATENT DOCUMENTS

| | | | |
|---|---|---|---|
| 8,297,425 B1 * | 10/2012 | le Roux | ................. F16D 43/12 |
| | | | 192/109 R |
| 9,377,104 B2 | 6/2016 | Kim | |
| 10,336,329 B2 | 7/2019 | Ohashi et al. | |
| 2012/0017871 A1 | 1/2012 | Matsuda | |
| 2015/0239471 A1 | 8/2015 | Azuma | |
| 2016/0084378 A1 | 3/2016 | Kim | |
| 2019/0039581 A1 * | 2/2019 | Iwatsuki | ................. B60T 7/122 |

FOREIGN PATENT DOCUMENTS

| | | |
|---|---|---|
| CN | 2725081 | 9/2005 |
| CN | 105459823 | 4/2016 |
| CN | 106573661 A | 4/2017 |
| EP | 2 415 994 | 2/2012 |
| GB | 418437 A | 10/1934 |
| KR | 101550638 | 9/2015 |
| TW | 201223820 | 6/2012 |
| TW | I411553 | 10/2013 |
| WO | 2011/037472 A1 | 3/2011 |

OTHER PUBLICATIONS

Office Action issued in Chinese Patent Application No. 201880062072.5 dated Aug. 9, 2022.

* cited by examiner

METHOD FOR LIMITING THE SPEED OF A MOTORCYCLE

BACKGROUND OF THE INVENTION

Field of the Invention

The present invention relates, in general, to limiting the speed of a motorcycle and, more particularly, to the smart management of the activation/deactivation of a speed limiter and to the implementation of limit speeds in such a speed limiter.

It finds applications in particular in motorcycles of the two-wheel type, having a high power/weight ratio and a high capacity for acceleration. In such applications, the invention makes it possible to improve motorcycle rider safety, while at the same time making the best of their riding experience.

Description of the Related Art

The use of speed limiters in motorized vehicles of the automobile type is widespread nowadays. They allow an improvement in the driving comfort and safety of the users of the vehicles equipped therewith. Specifically, when activated, speed limiters make it possible to limit the speed of the vehicle, whatever the acceleration demanded by the driver. In so doing, any unintentional exceeding of the authorized speed limit can be avoided, and the effort required by the driver for permanent control of the speed of the vehicle is also reduced.

However, considerations inherent in the safety of the users of certain vehicles such as motorcycles or high-powered motorbikes make implementation of such speed-limiting systems somewhat unsuitable. In particular, the management of known speed limiters for automobiles often requires the driver to perform complex manipulations in order to activate a speed-limiting mode, activate or deactivate the speed limiter and set limit speeds, such as, for example, the use of a great many control buttons. In addition, the speed limiter of an automobile is often rendered inactive by the request on the part of the driver for strong acceleration (or even maximum acceleration).

Now, these operational features of a speed limiter for an automobile are unsuitable for riding a motorcycle of the high-powered two-wheeled type. Specifically, the power/weight ratio of such a motorbike is high and, therefore, the speed and the capacity for acceleration may be very great.

It then follows that the rider of a high-powered motorbike is unable to perform a high number of manipulations in order to activate or deactivate a speed-limiting mode or to set a new limit speed that the speed limiter is to apply, because he always needs to keep his attention on the actual riding.

In addition, entering a mode of operation with speed-limiting or exiting such a mode of operation predicated upon a very high or maximum demand for acceleration on the part of the rider presents a potential danger, given the short amount of time that it takes for this type of vehicle to respond to a request for acceleration and to reach a very high speed. The jerks experienced by the vehicle when entering or exiting the speed-limited regime may cause the rider to become unbalanced, and this is potentially dangerous because it may cause the motorbike to become unstable and fall over.

SUMMARY OF THE INVENTION

In order to alleviate all or some of the aforementioned disadvantages of the prior art, the invention proposes a method for limiting the speed of a motorcycle, said motorcycle comprising a speed limiter able to operate, when a motorcycle speed-limiting mode is in an active state, to limit the speed of the motorcycle to at least a first speed limit $V_{lim}$, wherein:

the speed limiter is switched from an inactive state to the active state if, and only if:

the instantaneous speed of travel V of the motorcycle is above the speed limit $V_{lim}$ and below said speed limit $V_{lim}$ increased by a determined speed margin $V_{th}$; and, an engine torque $CM_{req}$ required by the rider of the motorcycle is below an engine torque CM that makes it possible to maintain the instantaneous speed of travel V of the motorcycle, increased by a first determined engine torque margin value $CM_{th}$; and also the acceleration of the motorcycle is positive, such that the limiter, thus rendered active, commands the supply, to the motorcycle, of an engine torque equal in value to CM so as to maintain the instantaneous speed of travel V of the motorcycle, and wherein, the speed limiter is switched from the active state to the inactive state if the engine torque $CM_{req}$ required by the user is below the engine torque CM decreased by a second determined engine torque margin value Y, or if the engine torque $CM_{req}$ required by the user is above the engine torque CM increased by the first engine torque margin value $CM_{th}$, such that the engine torque required by the user is supplied to the motorcycle.

The proposed invention thus offers a solution to the technical problem associated with the use of a speed limiter in a motorcycle that has a high capacity for acceleration. It allows the rider in a simple way to control the limiter system by activating and deactivating a speed-limiting mode, or by adding and removing new speed limits without the need for complex maneuverings. In addition, it allows a limiter to be rendered active or inactive and therefore in concrete terms allows the speed of the motorcycle to be limited without creating jerks (on activation or deactivation). In summary, the invention allows the use of a speed-limiting system in a motorcycle that has a high power/weight ratio by avoiding the sources of interference with the riding and the effects liable to jeopardize its stability.

According to one feature of the method according to the invention, the speed limiter comprises three, four or five speed limits.

According to another feature of the method according to the invention, activation of the speed-limiting mode, deactivation of the speed-limiting mode and/or the recording of a speed limit for the speed limiter are obtained by the rider pressing a single control button of the motorcycle.

According to another feature of the method according to the invention, when the rider presses the control button for a duration longer than a first duration $X_1$ and shorter than a second duration $X_2$, the speed-limiting mode is rendered active or inactive according to whether, before the pressing of the button, it was respectively inactive or active; and/or, when the rider presses the control button for a duration longer than the second duration $X_2$ and shorter than a third $X_3$, the instantaneous speed of the motorcycle is stored as a speed limit in an electronic memory of the speed limiter; and/or when the rider presses on the single button for a duration longer than the third duration $X_3$, the speed limiter speed limit closest to the instantaneous speed of the motorcycle is deleted from the electronic memory of the speed limiter.

According to another feature of the method according to the invention, when the rider presses on the single button for a duration longer than the second duration $X_2$ and shorter than the third duration $X_3$:

if the speed limiter already has one or more speed limits stored in the electronic memory and which are within an interval of plus or minus 10 kilometers per hour around the instantaneous speed of the motorcycle at the moment of the pressing of the control button, then said instantaneous speed is stored in the electronic memory and any other speed limit comprised within said interval is deleted from the electronic memory;

if the speed limiter does not have any speed limit stored in the electronic memory which is within an interval of plus or minus 10 kilometers per hour around the instantaneous speed of the motorcycle at the moment of the pressing of the control button, then:

if a maximum number of speed limits that can be stored in the electronic memory of the speed limiter has not yet been reached, then the instantaneous speed of the motorcycle at the moment of the pressing of the control button is stored in the electronic memory as the speed limit for the speed limiter;

if the maximum number of speed limits that can be stored in the electronic memory of the speed limiter has already been reached, then the speed limit stored in the memory of the speed limiter and which is closest to the instantaneous speed of the motorcycle at the moment of the pressing of the control button is replaced in the electronic memory by said instantaneous speed as the new speed limit for the speed limiter.

According to another feature of the method according to the invention, the speed limiter will not activate if the inclination, as measured by an on-board inclination sensor, of the motorcycle with respect to the vertical is above a determined inclination value.

According to another feature of the method according to the invention, when the speed limiter is rendered inactive after having been active, the required torque supplied to the motorcycle reaches the torque required by the user gradually so as to avoid any jerkiness in the acceleration of the motorcycle.

According to another feature of the method according to the invention, the motorcycle is of the two-wheeled type with a high cylinder capacity, for example greater than 250 cm$^3$ or 350 cm$^3$.

According to another feature of the method according to the invention, the speed margin value $V_{th}$ is equal to 1 kilometer per hour and the second engine torque margin value Y is equal to 5 Newton meters.

According to another feature of the method according to the invention, the first determined duration $X_1$ is substantially equal to 0.2 seconds, the second determined duration $X_2$ is substantially equal to 1 second, and the third determined duration $X_3$ is substantially equal to 3 seconds.

According to another feature of the method according to the invention, the value of engine torque CM that enables the instantaneous speed of travel V of the motorcycle to be maintained is calculated on the basis of the value of the engine torque applied and of the value of the engine torque corresponding to the measured acceleration at the given instant, and is equal to said value of the engine torque applied, decreased by said value of the engine torque corresponding to the acceleration measured at the given instant.

In a second aspect, the invention also relates to a control unit of a speed limiter for a motorcycle and which is configured to implement all the steps of the method according to any one of the preceding embodiments.

BRIEF DESCRIPTION OF THE DRAWINGS

Further features and advantages of the invention will become apparent from reading the following description of nonlimiting embodiments, with reference to the attached drawings in which.

DESCRIPTION OF THE PREFERRED EMBODIMENTS

Figure 1:
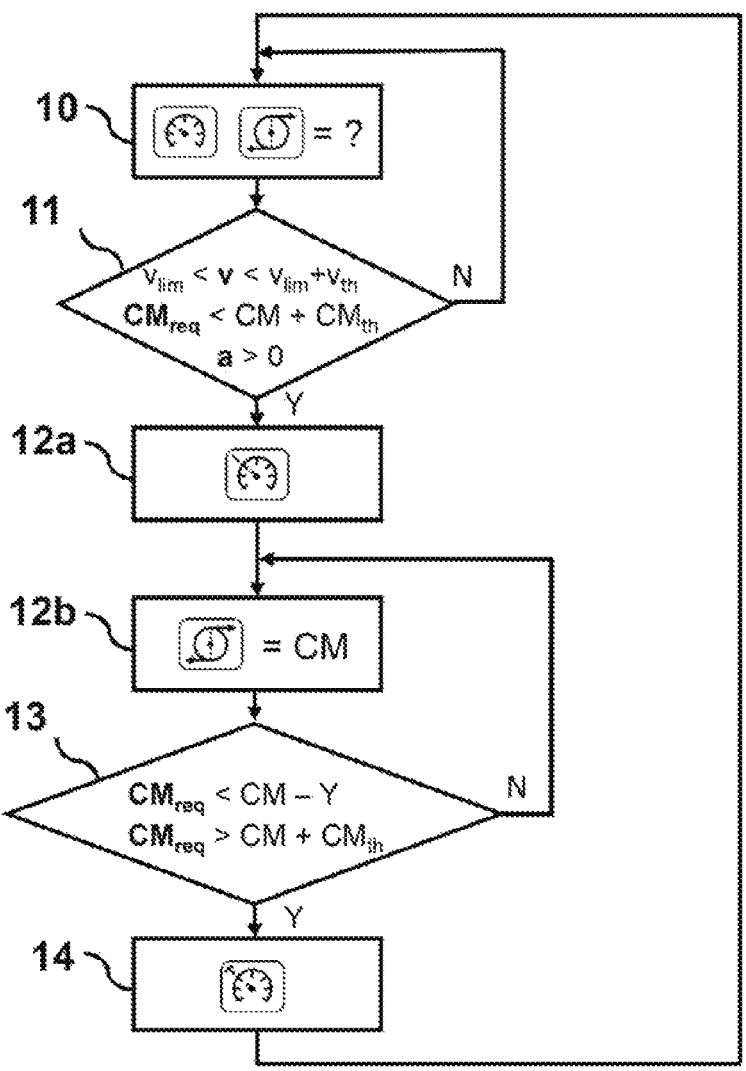
FIG. 1 is a diagram of steps illustrating one embodiment of the method according to the invention.

FIG. 1 shows a diagram of steps of an embodiment of the method for limiting the speed of a motorcycle, more particularly a high-powered motorbike. What is meant by a "high-powered motorbike" is a motorcycle having a high power/weight ratio, for example a two-wheeled vehicle the cylinder capacity of which exceeds 250 cm$^3$, or even 350 cm$^3$. However, the invention is not restricted to these examples.

The method illustrated in FIG. 1 allows management of the speed limiter, and notably activation or deactivation of same on the basis of precise riding criteria, in the event that a motorcycle speed-limiting mode is already in the active state. Specifically, in the exemplary embodiment described here, the limiter (which means to say the device that in concrete terms applies a speed limit when activated) can be activated only if the motorcycle speed-limiting mode is itself in the active state. One embodiment of the activation and deactivation of the speed-limiting mode will notably form the subject of FIG. 2 described below.

In the example of FIG. 1, the motorcycle is therefore in a situation in which the speed-limiting mode is in the active state. In the initial step 10, the limiter is in the inactive state and the engine torque actually delivered corresponds to the engine torque directly requested by the rider. In the case of a motorbike, for example, the rider demands a given acceleration, and therefore an engine torque that enables this acceleration to be obtained, by actuating the hand throttle according to his wishes. Before the speed limiter is activated, there is therefore no restriction applied to the engine torque delivered, and this torque converges as quickly as possible onto the engine torque required by the rider.

In one nonlimiting embodiment, the motorcycle speed limiter may comprise one or more speed limits which will each be of use in their turn in different riding situations. The speed limiter may, for example, incorporate a 50-km/h limit that can be used in built-up areas, a 90-km/h limit that can be used on main roads, another speed limit equal to 110 km/h, and a final, 130-km/h limit both of which can be used on freeways. In this way, riding comfort and safety can be improved thanks to the embodiments of the invention in the various riding environments faced by the rider, simply by switching from one limit to another.

In the exemplary embodiment of FIG. 1, the steps of the method can be carried out by an engine control unit which governs all of the operations. Furthermore, said control unit may comprise a memory (able to store information and erase said information if appropriate) in which the existing limits used by the limiter are stored.

In a riding context (namely when the motorcycle is moving along), the motorcycle in motion can, at each instant, be notably characterized by its speed, its acceleration, its engine torque and the rotational speed of its engine. On the basis of these characteristic data, it is possible to determine, in real time (for example through calculations performed by a control unit) a value for engine torque that allows the speed of the motorcycle to be maintained at its current value and a value for the torque that makes it possible to achieve a given acceleration. For example, the value of the torque that allows a constant speed to be maintained may evolve over time, depending on the gradient of the road on which the motorcycle is running at any given instant. However, the engine torque that allows a given speed to be maintained may also, for example, be calculated as a function of the engine torque applied and of the speed gradient (which is to say the acceleration) measured. In that case, it is, for example, equal to the engine torque applied decreased by the torque corresponding to the measured acceleration, this notably making it independent of the gradient of the road.

Step 11 consists in determining whether a set of criteria, which govern the triggering of step 12, are met. In particular:
- if the instantaneous speed V of the motorcycle is above a limit $V_{lim}$ of the limiter and below this limit increased by $V_{th}$=3 km/h (this value corresponds to one nonlimiting embodiment); and
- if the engine torque $CM_{req}$ required by the driver is below that CM which would allow its speed to be kept at its instantaneous speed (namely the speed at which the motorbike is moving at the moment of the request) increased by an engine torque corresponding to a given acceleration (or threshold engine torque $CM_{th}$); and
- if the acceleration of the motorcycle is positive, namely if the motorcycle is indeed in an acceleration phase rather than a deceleration phase.

The test in step 11 is validated if all the aforementioned conditions are simultaneously met. If it is not validated, step 10 of the method is performed again; if it is validated, step 12 is carried out.

Step 12 comprises the sub-step of activating the speed limiter 12a in response to the request for an engine torque that makes it possible to maintain the instantaneous speed and for the control of the actual delivery of this torque 12b. In this situation, once the limiter is in the active state, the speed of the motorcycle is kept constant at a value very close to one of the speed limits of the limiter (to within around 1 km/h, for example) as long as no action on the part of the rider deactivates the speed limiter.

Step 13 consists in examining whether or not there has been such an action on the part of the driver, by checking for the occurrence of certain specific conditions, namely, in one example:
- if the driver requires an engine torque $CM_{req}$ lower than the engine torque CM for maintaining the instantaneous speed decreased by Y=5 Newton meters (this value Y is an example that corresponds to one nonlimiting embodiment); or
- if the driver requires an engine torque $CM_{req}$ higher than the engine torque CM for maintaining the instantaneous speed increased by the engine torque corresponding to a given acceleration (for example $CM_{th}$, namely the same torque as the one used in the criteria for activating the limiter, this being a nonlimiting example).

The test in step 13 is validated as soon as one or other of the aforementioned conditions occurs. If it is not validated, sub-step 12b of the method is performed again, requiring and delivering the engine torque that allows the instantaneous speed to be maintained. If it is validated, the limiter is then deactivated in step 14 and the return to step 10 leads once again to the delivery of the engine torque required by the rider.

One of the advantages afforded by the invention lies notably in the fact that the value of the threshold engine torque $CM_{th}$ which is used, amongst other things, as a criterion for the activation or deactivation of the speed limiter, can be fixed in such a way as to minimize the sharp accelerations potentially associated with the crossing of a speed limit previously applied in response to a command from the user. In concrete terms, and in contrast with the prior art, it is possible to cross a speed limit stored in memory and applied without calling for the maximum available engine torque.

Furthermore, this criterion also makes it possible, aside from the fact of obtaining a "gentle" exit from speed limitation, to not allow the motorcycle to latch onto a speed limit when the rider accelerates sharply on approaching this speed limit. Stated differently, the limiter will not be rendered active because one of the three conditions required for its activation will not be met because of the request for an engine torque that is directly higher than the speed-maintaining value plus the threshold value. The limit will therefore be transparent from the rider's viewpoint.

Activation and deactivation of the speed limiter will be perceived by the rider but do not cause any jerkiness or variation in acceleration liable to interfere with his riding or endanger him by destabilizing his machine, notably in bends in the road.

In addition, in order to enhance this aspect, in one embodiment of the method, when the limiter is rendered inactive and the torque delivered returns to being the torque required by the driver, the return to this torque value can be obtained more gradually. In other words, the torque gradient that provides the transition from the engine torque delivered when the speed limitation is active to the engine torque delivered when the speed limitation is inactive, can be limited in such a way that the change takes place more slowly than a standard change in torque, i.e. a change in response to a request in a context in which no limiting mode is active.

In this way, when the rider leaves one speed limit he regains the full acceleration capability of the motorcycle only gradually, and this contributes to maintaining a "flexible" behavior of the motorcycle despite the activation and deactivation of the speed limiter, and to giving the rider time to feel that he is leaving a hitherto-applied speed limit so that he can anticipate the effects this will have on the behavior of the motorcycle.

Figure 2:
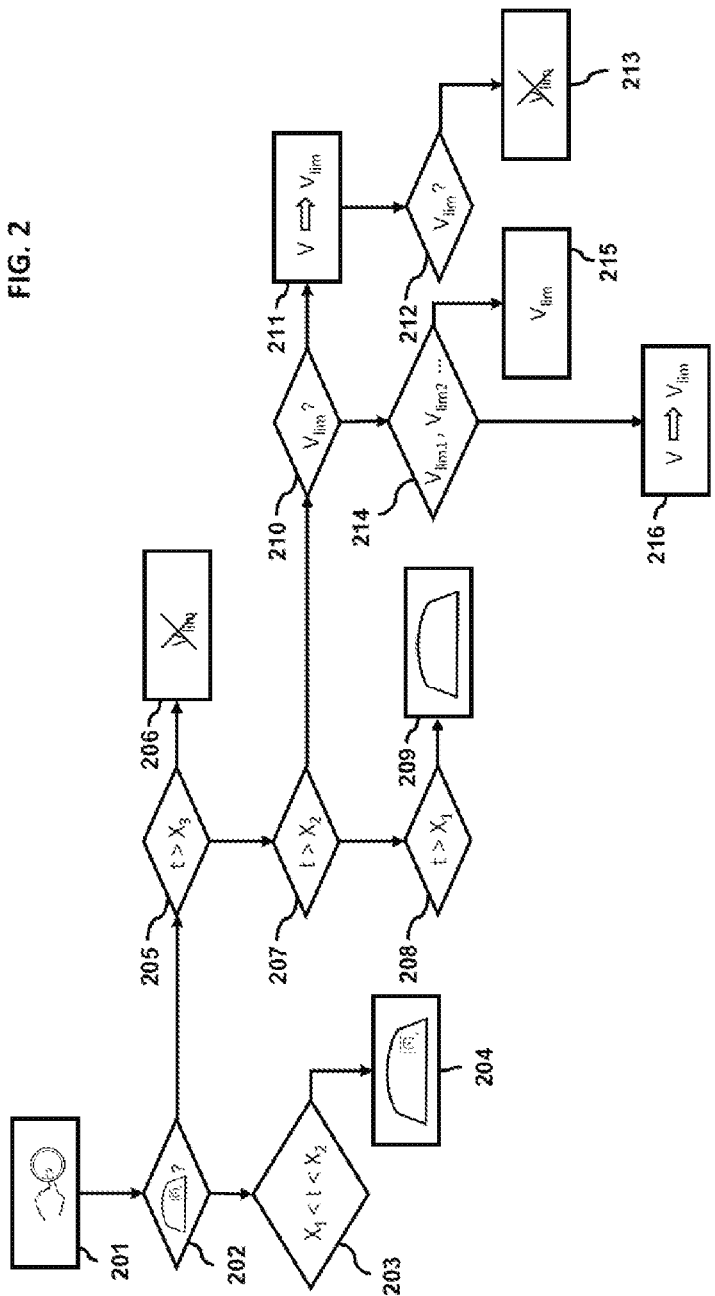
FIG. 2 is a diagram of steps illustrating one particular embodiment of the method according to the invention.

FIG. 2 is a diagram of steps of one nonlimiting embodiment describing the steps of activating/deactivating the speed-limiting mode and of recording/erasing speed limits used by the limiter. These steps are in addition to the steps described in FIG. 1 and supplement the management method illustrated by those steps.

In the embodiment illustrated in FIG. 2, the actions for controlling the speed-limiting mode and for storing limits are performed by the rider by the presses on a single button. This button may, for example, in the case of a motorcycle, be situated on the handlebar, and the duration of the presses applied to this button by the rider may allow him to discriminate between the actions he expects to obtain by manipulating this single button. In this way, the management of the operations by the rider interferes very little with his riding because it does not involve a complicated maneuver, such as the moving of several digits in order to manipulate a combination of buttons or other members, liable to interfere with the rider and detract from the user's hold of the handlebar. This limited impact is all the more advantageous in the case of a high-powered motorbike for which the level of attention required for riding is all the higher.

During the initial step 201, the rider applies a single press to the limiting mode control button. Step 200 and then consists in querying whether the limiting mode is active or inactive.

If the limiting mode is inactive, step 203 consists in determining the duration t of the pressing of the button and, if this duration is comprised between $X_1$=0.2 seconds and $X_2$=1 second, initiating step 404, which consists in rendering the speed-limiting mode active.

If the limiting mode is already active at the moment of pressing, there are a number of actions that may be triggered according to the duration of the pressing of the button.

Step 205 consists in determining whether or not the duration t of this press is greater than $X_3$=3 seconds. If it is, step 206 means that the limiter speed limit $V_{lim}$ closest to the instantaneous speed of the motorcycle will be erased from the limiter. This can be done for example by erasing this limit from the memory containing various limits if appropriate.

If it is not, step 207 then consists in determining whether or not the duration t of the press is greater than $X_2$=1 second. If it is less than 1 second, step 208 consists in verifying that this duration t is greater than $X_3$=0.2 seconds and, if it is, in rendering the speed-limiting mode inactive in step 209. By contrast, if the duration t is greater than $X_2$=1 second, the set of steps described hereinbelow governs the recording or the erasing of speed limit(s) in/from the limiter. Specifically, as was described earlier, the limiter may contain several (for example 4) limits the management of which is still performed using the same button.

Step 210 consists in checking whether there exists a speed limit $V_{lim}$ close (for example within plus or minus 10 kilometers per hour) to the instantaneous speed of the motorcycle. If there is, this limit is replaced by the instantaneous speed, in step 211. In addition, step 212 performs a second check on the potential existence of another close speed limit (within the same range of speeds as the one defined hereinabove) and, if there is, in erasing this limit in the context of step 213.

If step 210 concludes that a close speed limit does not exist, then step 214 consists in verifying whether or not the maximum number of speed limits $V_{lim1}$, $V_{lim2}$, . . . of the limiter has been reached (for example by interrogating a memory) and in directly incorporating the instantaneous speed as a new speed limit 215 if the maximum number of speed limits has not yet been reached, or in replacing the closest speed limit 216 if the opposite is true.

In this embodiment, the use of a single button therefore allows both activation and deactivation of the speed-limiting mode, which is a prerequisite for the use of the limiter, and also the inputting of one or more speed limits through simple manipulations.

Furthermore, the steps illustrated in FIG. 2 may occur at any moment during the course of the management method described above with reference to the diagram of steps of FIG. 1. This makes it possible, during the course of use of the speed limiter, to input a new speed limit or erase another one. In addition, the rider can also deactivate the speed-limiting mode and therefore completely disable the use of the speed limiter, and can do so very easily as soon as he so wishes.

Thus, for example, in a situation in which the rider is required to change riding environment and maximum authorized speed, for example on entering a built-up area, he can elect to rely on the operation of the limiter by switching notably from one speed limit to another easily, or to deactivate the speed-limiting mode if he so prefers.

All of these advantages together contribute to the use of a speed-limiting system while ensuring the safety and comfort of the rider of a high-powered motorcycle by minimizing all the sources of interference with the riding (distraction of the rider or unbalancing of the motorcycle, for example).

The invention claimed is:

1. A method for limiting a speed of a motorcycle that is equipped with a speed limiter configured to operate, when a motorcycle speed-limiting mode is in an active state, to limit the speed of the motorcycle to a speed limit $V_{lim}$, comprising:

switching the speed limiter from an inactive state to the active state only when:
an instantaneous speed of travel V of the motorcycle is above the speed limit $V_{lim}$ and below said speed limit $V_{lim}$ increased by a determined speed margin value $V_{th}$,
an engine torque $CM_{req}$ required by the rider of the motorcycle is below an engine torque CM that maintains the instantaneous speed of travel V of the motorcycle, increased by a first determined engine torque margin value $CM_{th}$, and
an acceleration of the motorcycle is positive,
such that the limiter, thus rendered active, commands supply, to the motorcycle, of an engine torque equal in value to CM so as to maintain the instantaneous speed of travel V of the motorcycle; and
switching the speed limiter from the active state to the inactive state when either of
the engine torque required by the rider is below the engine torque CM decreased by a second determined engine torque margin value Y, or
the engine torque required by the rider is above the engine torque CM increased by the first engine torque margin value $CM_{th}$,
such that the engine torque required by the rider is supplied to the motorcycle.

2. The method as claimed in claim 1, wherein the speed limiter is configured to limit the speed of the motorcycle to any of three, four or five speed limits.

3. The method as claimed in claim 1, wherein activation of the speed-limiting mode, deactivation of the speed-limiting mode, and/or recording of the speed limit for the speed limiter are achieved by the rider pressing a single control button of the motorcycle.

4. The method as claimed in claim 3, wherein:
when the rider presses the control button for a duration t longer than a first duration $X_1$ and shorter than a second duration $X_2$, the speed-limiting mode is rendered active or inactive according to whether, before the pressing of the button, the speed-limiting mode was respectively inactive or active; and/or
when the rider presses the control button for a duration t longer than the second duration $X_2$ and shorter than a third duration $X_3$, the instantaneous speed of the motorcycle is stored as the speed limit $V_{lim}$ in an electronic memory of the speed limiter; and/or when the rider presses on the single button for a duration t longer than the third duration $X_3$, a speed limit closest to the instantaneous speed of the motorcycle is deleted from the electronic memory of the speed limiter.

5. The method as claimed in claim 4, wherein, when the rider presses on the single button for a duration t longer than the second duration $X_2$ and shorter than the third duration $X_3$:

when the speed limiter already has one or more speed limits stored in the electronic memory and which are within an interval of plus or minus 10 kilometers per hour around the instantaneous speed of the motorcycle at the moment of the pressing of the control button, then said instantaneous speed is stored in the electronic memory and any other speed limit comprised within said interval is deleted from the electronic memory; and when the speed limiter does not have any speed limit stored in the electronic memory which is within an interval of plus or minus 10 kilometers per hour around the instantaneous speed of the motorcycle at the moment of the pressing of the control button, then:

when a maximum number of speed limits that can be stored in the electronic memory of the speed limiter has not yet been reached, then the instantaneous speed of the motorcycle at the moment of the pressing of the control button is stored in the electronic memory as the speed limit for the speed limiter, and when the maximum number of speed limits that can be stored in the electronic memory of the speed limiter has already been reached, then the speed limit stored in the memory of the speed limiter and which is closest to the instantaneous speed of the motorcycle at the moment of the pressing of the control button is replaced in the electronic memory by said instantaneous speed as the new speed limit for the speed limiter.

6. The method as claimed in claim 1, wherein the speed limiter is prevented from activating when an inclination of the motorcycle with respect to vertical, as measured by an on-board inclination sensor, is greater than a determined inclination value.

7. The method as claimed in claim 1, wherein, when the speed limiter is rendered inactive after having been active, the required torque supplied to the motorcycle reaches the torque required by the rider gradually so as to avoid any jerkiness in the acceleration of the motorcycle.

8. The method as claimed in claim 1, wherein the motorcycle is of a two-wheeled type with a high cylinder capacity, greater than 350 cm$^3$.

9. The method as claimed in claim 1, wherein the speed margin value $V_{th}$ is equal to 1 kilometer per hour and the second determined engine torque margin value Y is equal to 5 Newton meters.

10. The method as claimed in claim 4, wherein the first duration $X_1$ is substantially equal to 0.2 seconds, the second duration $X_2$ is substantially equal to 1 second, and the third duration $X_3$ is substantially equal to 3 seconds.

11. The method as claimed in claim 1, wherein the value of the engine torque CM that maintains the instantaneous speed of travel V of the motorcycle is calculated from a value of the engine torque applied and from a value of an engine torque corresponding to a measured acceleration at the given instant, and is equal to said value of the engine torque applied, decreased by said value of the engine torque corresponding to the acceleration measured at the given instant.

12. The method as claimed in claim 2, wherein activation of the speed-limiting mode, deactivation of the speed-limiting mode, and/or recording of the speed limit for the speed limiter are achieved by the rider pressing a single control button of the motorcycle.

13. The method as claimed in claim 2, wherein the speed limiter is prevented from activating when an inclination of the motorcycle with respect to vertical, as measured by an on-board inclination sensor, is greater than a determined inclination value.

14. The method as claimed in claim 3, wherein the speed limiter is prevented from activating when an inclination of the motorcycle with respect to vertical, as measured by an on-board inclination sensor, is greater than a determined inclination value.

15. The method as claimed in claim 4, wherein the speed limiter is prevented from activating when an inclination of the motorcycle with respect to vertical, as measured by an on-board inclination sensor, is greater than a determined inclination value.

16. The method as claimed in claim 5, wherein the speed limiter is prevented from activating when an inclination of the motorcycle with respect to vertical, as measured by an on-board inclination sensor, is greater than a determined inclination value.

17. The method as claimed in claim 2, wherein, when the speed limiter is rendered inactive after having been active, the required torque supplied to the motorcycle reaches the torque required by the rider gradually so as to avoid any jerkiness in the acceleration of the motorcycle.

18. The method as claimed in claim 3, wherein, when the speed limiter is rendered inactive after having been active, the required torque supplied to the motorcycle reaches the torque required by the rider gradually so as to avoid any jerkiness in the acceleration of the motorcycle.

19. The method as claimed in claim 4, wherein, when the speed limiter is rendered inactive after having been active, the required torque supplied to the motorcycle reaches the torque required by the rider gradually so as to avoid any jerkiness in the acceleration of the motorcycle.

20. A control unit for a speed limiter for a motorcycle, the speed limiter configured to operate, when a motorcycle speed-limiting mode is in an active state, to limit the speed of the motorcycle to a speed limit $V_{lim}$, the control unit configured to:

switch the speed limiter from an inactive state to the active state only when:

an instantaneous speed of travel V of the motorcycle is above the speed limit $V_{lim}$ and below said speed limit $V_{lim}$ increased by a determined speed margin value $V_{th}$, an engine torque $CM_{req}$ required by the rider of the motorcycle is below an engine torque CM that maintains the instantaneous speed of travel V of the motorcycle, increased by a first determined engine torque margin value $CM_{th}$, and an acceleration of the motorcycle is positive, such that the limiter, thus rendered active, commands supply, to the motorcycle, of an engine torque equal in value to CM so as to maintain the instantaneous speed of travel V of the motorcycle; and switch the speed limiter from the active state to the inactive state when either of the engine torque required by the rider is below the engine torque CM decreased by a second determined engine torque margin value Y, or the engine torque required by the rider is above the engine torque CM increased by the first engine torque margin value $CM_{th}$, such that the engine torque required by the rider is supplied to the motorcycle.

* * * * *